US008422595B2

(12) United States Patent
Jiang

(10) Patent No.: US 8,422,595 B2
(45) Date of Patent: Apr. 16, 2013

(54) CHANNEL ESTIMATION FOR COMMUNICATION SYSTEMS WITH MULTIPLE TRANSMIT ANTENNAS

(75) Inventor: Sen Jiang, Beijing (CN)

(73) Assignee: STMicroelectronics (Beijing) R&D Co. Ltd., Beijing (CN)

( * ) Notice: Subject to any disclaimer, the term of this patent is extended or adjusted under 35 U.S.C. 154(b) by 306 days.

(21) Appl. No.: 12/860,267

(22) Filed: Aug. 20, 2010

(65) Prior Publication Data

US 2011/0159831 A1        Jun. 30, 2011

(30) Foreign Application Priority Data

Dec. 28, 2009   (CN) .......................... 2009 1 0265274

(51) Int. Cl.
*H04L 27/00*         (2006.01)
*H04K 3/00*          (2006.01)

(52) U.S. Cl.
USPC .......................................... 375/326; 375/342

(58) Field of Classification Search .................. 375/260,
375/326, 342; 370/208, 210
See application file for complete search history.

(56) References Cited

U.S. PATENT DOCUMENTS

| | | | |
|---|---|---|---|
| 6,473,393 | B1 | 10/2002 | Ariyavisitakul et al. |
| 6,940,914 | B1 | 9/2005 | Lo et al. |
| 7,039,001 | B2 | 5/2006 | Krishnan et al. |
| 7,139,321 | B2 | 11/2006 | Giannakis et al. |
| 7,251,282 | B2 * | 7/2007 | Maltsev et al. ............... 375/260 |
| 7,388,920 | B2 | 6/2008 | Nam et al. |
| 7,440,507 | B1 | 10/2008 | Lo et al. |
| 7,453,793 | B1 | 11/2008 | Jones, IV et al. |

OTHER PUBLICATIONS

Ye (Geoffrey) Li, "Simplified Channel Estimation for OFDM Systems with Multiple Transmit Antennas", IEEE Transactions on Wireless Communications, vol. 1.,No. 1, pp. 67-75, Jan. 2002.
Jianxuan Du, Ye Li, "MIMO-OFDM channel estimation based on subspace tracking", IEEE Proc. of VTC 2003-Spring, vol. 2., pp. 1084-1088, Apr. 2003.
Jan-Jaap van de Beek, Ove Edfors, Magnus Sandell, Sarah Kate Wilson, Per Ola Borjesson "On Channel Estimation in OFDM Systems", IEEE Proc. of VTC'95, vol. 2., pp. 815-819, Jul. 1995.
Spatial Channel Model for multiple input multiple output (MIMO) simulations, 3GPP TR 25.996 V6.10, Sep. 2003, pp. 40.

* cited by examiner

*Primary Examiner* — Lee Nguyen
(74) *Attorney, Agent, or Firm* — Graybeal Jackson LLP

(57) ABSTRACT

According to an embodiment, a receiver, system and method for channel estimation in a communications system utilizing multiple transmit antennas are provided. The receiver comprises an antenna node operable to receive a signal that includes a superposition of at least a first signal corresponding to a first sequence and a second signal corresponding to a second sequence; and a channel estimator, coupled to the antenna node, operable to correlate the received signal with at least one of the first and second sequences, to determine at least one boundary between at least two waveforms resulting from the correlation, and to calculate using the boundary and the at least two waveforms a first channel response corresponding to the first signal and a second channel response corresponding the second signal. Channel estimates are determined based on determined boundaries and may be smoothed by a Savitzky-Golay filter in the frequency domain. The variance of additive white Gaussian noise (AWGN) may also be estimated.

27 Claims, 5 Drawing Sheets

CHANNEL ESTIMATION FOR COMMUNICATION SYSTEMS WITH MULTIPLE TRANSMIT ANTENNAS

PRIORITY CLAIM

The instant application claims priority to Chinese Patent Application No. 200910265274.2, filed Dec. 28, 2009, which application is incorporated herein by reference in its entirety.

BACKGROUND

Multiple transmit and receive antennas may be used in multicarrier communication systems, such as multiple-input, multiple-output (MIMO) orthogonal frequency division multiplexing (OFDM) systems, to improve communication quality and capacity. OFDM effectively partitions the overall system bandwidth into a number of orthogonal frequency subchannels. These subchannels are also interchangeably referred to throughout this document as "tones" or "subcarriers." Examples of such MIMO OFDM systems include, but are not limited to, WiMAX, IEEE 802.11a, IEEE 802.11g, IEEE 802.11n and 3GPP LTE. Such MIMO systems generally include a transmitter having multiple transmit antennas communicating with a receiver having one or more receive antennas (the number of transmit antennas and the number of receive antennas may or may not be equal). In a MIMO communication system, each of the transmit antennas transmits, at substantially the same time, M different symbols on the same group of subcarriers, where M is the number of transmit antennas. Although each transmit antenna transmits a respective symbol on at least some of the same subcarriers, the spacings between the antennas (e.g., approximately one half wavelength of the carrier frequency (for example, 5.4 GHz) that is modulated by the subcarriers) are selected so that the symbols may be recovered at the receiver. To generate the M symbols, a serial bit-stream may be converted into M groups of multi-bit subsymbols that each modulate a respective one of the subcarriers.

An accurate estimate of the signal response of the respective channel between each transmit antenna and each receive antenna is needed to effectively indicate which subcarriers are available for carrying subsymbols, and to effectively recover the symbols collectively transmitted on the available subcarriers. This channel estimation is typically performed by sending a group of predetermined training sequences from the transmitter (at least one predetermined sequence for each transmit antenna) and measuring the received training sequence at the receiver. Since the predetermined training sequences may have special orthogonal characteristics and are known a priori by the receiver, the respective signal response at each subcarrier for each channel may be estimated by correlating the received training sequences with the corresponding transmitted training sequences.

SUMMARY

According to an embodiment, a receiver, system and method for channel estimation in a communications system utilizing multiple transmit antennas are provided. The receiver comprises an antenna node operable to receive a signal that includes a superposition of at least a first signal corresponding to a first sequence and a second signal corresponding to a second sequence; and a channel estimator, coupled to the antenna node, operable to correlate the received signal with at least one of the first and second sequences, to determine at least one boundary between at least two waveforms resulting from the correlation, and to calculate using the boundary and the at least two waveforms a first channel response corresponding to the first signal and a second channel response corresponding the second signal.

A received signal comprising a group of predetermined training sequences transmitted from multiple antennas is correlated with one or more of those training sequences to determine at least one boundary between portions of the resulting waveforms. In an embodiment, such correlation is performed by multiplying the frequency domain version of the received signal with a conjugate of a frequency domain version of the one of the training sequences, and then perhaps perform an IFFT. The boundary between portions of the correlation waveform is determined, in one embodiment, by circularly shifting a sample window of predetermined width along each section of the correlation waveform to find the position at which the energy sum of samples within the window are minimized. In another embodiment, the boundary may be determined by circularly shifting the sample window to find a position matching a desired threshold—for example, 20 db below the maximum magnitude. Channel estimates are determined based on the determined boundaries and may be smoothed by a Savitzky-Golay filter in the frequency domain. The variance of additive white Gaussian noise (AWGN) may also be estimated.

An advantage of an embodiment is that inaccuracies in channel estimation resulting from AWGN and the energy of one training sequence being mistakenly attributed to a neighboring training sequence may be reduced.

BRIEF DESCRIPTION OF THE DRAWINGS

One or more embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the subject matter disclosed herein. This disclosure is not intended to be limited to the embodiments shown, but is to be accorded the widest scope consistent with the principles and features disclosed or suggested herein.

In the following description, certain details are set forth in conjunction with the described embodiments to provide a sufficient understanding of the subject matter disclosed herein. One skilled in the art will appreciate, however, that the disclosed subject matter may be practiced without these particular details. Furthermore, one skilled in the art will appreciate that various modifications, equivalents, and combinations of the disclosed embodiments and components of such embodiments are within the scope of the disclosed subject matter. Embodiments including fewer than all the components or steps of any of the respective described embodiments may also be within the scope of the disclosed subject matter although not expressly described in detail below. Finally, the operation of well-known components and/or processes has not been shown or described in detail below to avoid unnecessarily obscuring the disclosed subject matter.

Figure 1:
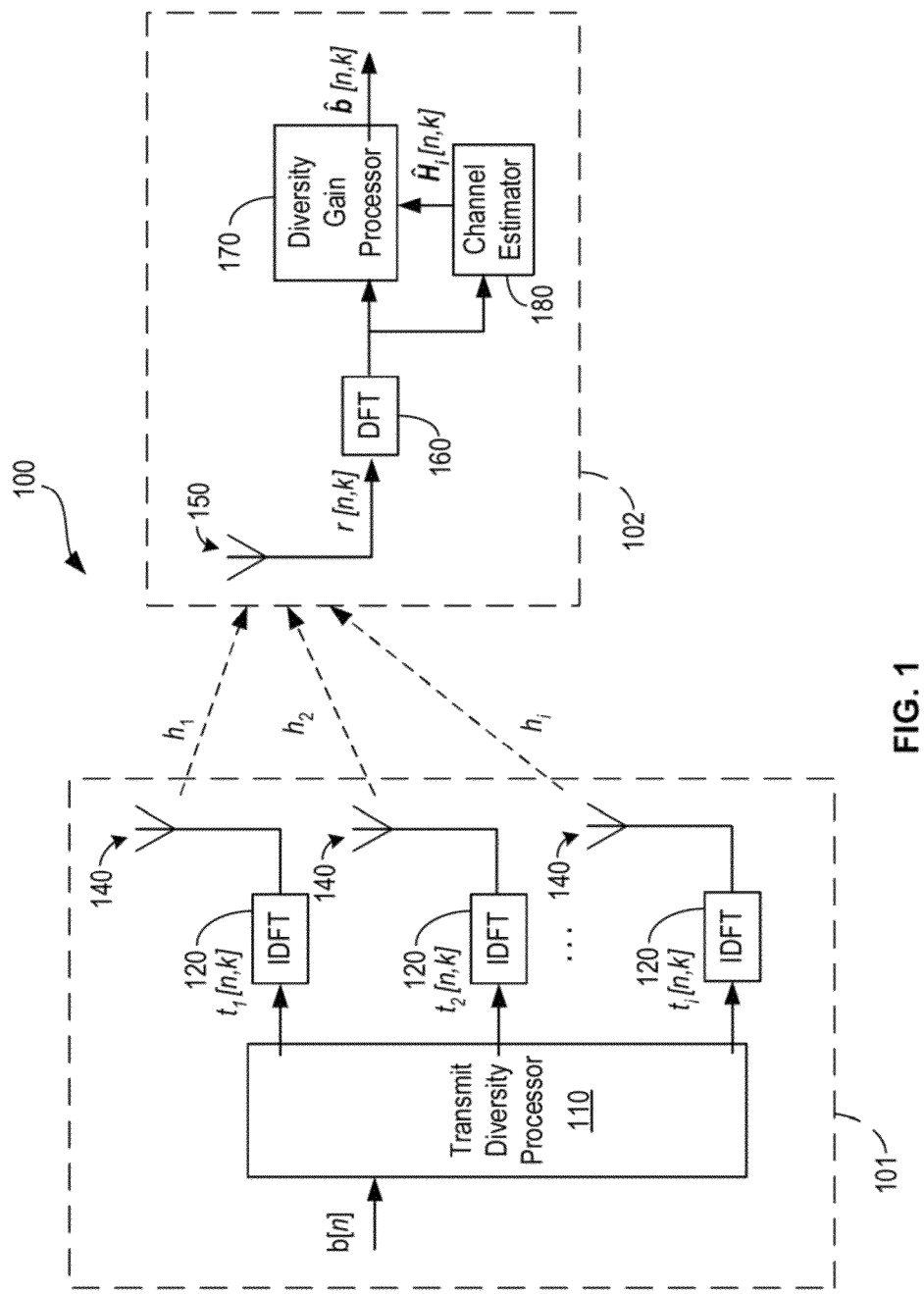
FIG. 1 is a block diagram of an embodiment of a wireless MIMO communications system.

FIG. 1 is a block diagram of an OFDM system 100, which includes a transmitter portion 101 and a receiver portion 102. The system 100 may be implemented in a variety of applications including, but not limited to, audio and video broadcast communications, cellular telephone transmitters and handsets, digital computer signal routers and modems, and network transmitters/receivers.

The transmitter 101 includes a transmit diversity processor 110, a number M of Inverse Discrete Fourier Transform (IDFT) blocks 120, and a number M of transmit antennas 140.

The transmit diversity processor 110 accepts a serial data block and transforms it into a plurality of frequency-domain blocks, which it then provides to respective IDFT blocks 120. Each frequency-domain block represents a respective symbol carried by a number of subcarriers and to be transmitted via a respective one of the M transmit antennas 140. At least some of the subcarriers may be the same as the subcarriers that carry the symbols transmitted via the others of the M transmit antennas 140. Furthermore, each frequency-domain block is converted to the time domain, and then the corresponding time-domain block may modulate a carrier frequency (e.g., 2.4 GHz or 5.4 GHz) to step the time-domain block up in frequency, Each of the IDFT blocks 120 receives a respective frequency-domain block from the transmit diversity processor 110, transforms the block using an Inverse Discrete Fourier Transform (IDFT), and provides the block to the corresponding transmit antenna 140 as a time-domain waveform.

Receiver 102 includes one or more receive antennas 150 (only one receive antenna is shown), a respective Discrete Fourier Transform (DFT) block 160 for each receive antenna, a diversity gain processor 170, and a channel estimator 180. In an embodiment, the portion of the digital transmitter 101 depicted in FIG. 1 may be implemented in a first integrated circuit (IC), and the portion of the receiver 102 depicted in FIG. 1 may be implemented in a second IC that is remote from the first IC. For example, the transmitter 101 may be part of a wireless router, and the receiver 102 may be part of a computer.

Each of the DFT blocks 160 (only one such block is shown) accepts a received time-domain signal from the receive antennas 150, transforms the signal using a Discrete Fourier Transform function, and provides the transformed signal to the diversity gain processor 170 and the channel estimator 180.

The diversity gain processor 170 accepts the transformed signal from the DFT block 160 and the channel estimates (a respective channel exists between each transmit antenna 140 and each receive antenna 150) from the channel estimator 180 to recover the serial data block as originally provided to the transmit diversity processor 110 within the transmitter portion 101.

Channel estimator 180 provides the channel-estimation matrices $\hat{H}_i[n,k]$ for $1 \leq i \leq$ (number of channels) to diversity gain processor 170, which in turn estimates the recovered serial data block $\hat{b}[n,k]$. That is, $\hat{H}_i[n,k]$ includes information corresponding to the $i^{th}$ channel between $i^{th}$ pair of transmit and receive antennas. The channel estimator 180 is discussed further below in conjunction with FIGS. 2-4.

In MIMO systems, the signal that each receive antenna 150 receives is a combination of signals from all of the M transmit antennas, and is modified both by the properties of the respective channels between the receive antenna and the transmit antennas and by noise. There is, therefore, a respective channel from each transmit antenna to each receive antenna, and separate channel estimates are made for each such channel. In the embodiment of system 100, there is a respective channel between each of transmit antennas 140 and the receive antenna 150; therefore, because there are M transmit antennas and one receive antenna, there are i=M respective channels in this embodiment. An estimation of the channel characteristics for each respective channel is performed regularly in order to compensate for changes in those characteristics, and the characteristics for each channel are represented by the coefficients that are the elements of the channel-estimation matrix $\hat{H}_i[n,k]$ for the $i^{th}$ channel. Because the channel estimator 180 receives an input from the DFT 160, the coefficients of $\hat{H}_i[n,k]$ are in the frequency domain; but in other embodiments of the system 100, the coefficients of $\hat{H}_i[n,k]$ may be in the time domain.

In operation, during a symbol period or time n, transmit diversity processor 110 transforms a serial data block b[n] into M different frequency-domain sequences $\{b_i[n,k]: k=0, \ldots, K-1 \& i=1, \ldots, M\}$, where K, k, and i are the number of data subchannels of the OFDM system 100, the subchannel (or tone) index, and the transmit-antenna channel index, respectively. Each of these sequences $b_i[n,k]$ forms a respective OFDM symbol via IDFT blocks 120 and conventional cycle prefix insertion. The transmit antennas 140 simultaneously and respectively transmit these OFDM symbols.

Each of the receiving antennas 150 (only one shown in FIG. 1) receives a signal, the frequency-domain representation of which is r[n,k]. This representation comprises the superposition of the transmitted time-domain data sequences $b_1[n,k]$, $b_2[n,k]$, ..., $b_i[n,k]$, distorted by the respective channel frequency responses $H_i[n,k]$ and additive noise w[n, k] (in an embodiment, the additive white noise is presumed to be the same for each channel i). The received signal r[n,k] at one receive antenna and at one subcarrier k may be generally expressed as:

$$r[n,k] = \sum_{i=1}^{i=M} H_i[n,k] b_i[n,k] + w[n,k] \qquad (1)$$

where $H_i[n,k]$ denotes the channel frequency response at the $k^{th}$ tone (subchannel or subcarrier) during the $n^{th}$ OFDM symbol of the $i^{th}$ communication path (e.g., the $i^{th}$ transmit antenna where there is only one receive antenna 150), and w[n,k] denotes the additive complex Gaussian noise for the $k^{th}$ tone at the receive antenna 150. This noise w[n,k] may be assumed to have a zero mean value and a variance $\sigma_n^2$.

For a MIMO OFDM system, the combined time-domain channel frequency response may be expressed as:

$$H[n, k] = \sum_{l=0}^{K_0-1} h[n, l] W_K^{kl} \qquad (2)$$

Where $h[n,l]=h(nT_f,l(T_s/K))$ is the channel impulse response sampled at a rate of $K\Delta f$, and $W_K=\exp(-j(2\pi/K))$. The variables $T_f$, $T_s$, and $\Delta f$ in the above expression are the block length, symbol duration, and tone spacing, respectively. Since the symbol duration is the reciprocal of the tone spacing, and the block length is equal to the sum of the symbol duration and the cyclic prefix, they are related by $T_s=1/\Delta f$ and $T_f=T_g+T_s$, where $T_g$ is the duration of the cyclic prefix. In equation (2), $K_0$ is the number of channel taps—the number of channel taps is the width in samples—of the channel impulse response. The frequency response at the $k^{th}$ subchannel of the $n^{th}$ block corresponding to the $i^{th}$ transmit antenna may be generally expressed as:

$$H_i[n, k] = \sum_{l=0}^{K_0-1} h_i[n, l] W_K^{kl} \qquad (3)$$

Given the received signal $r[n,k]$, the receiver portion 102 estimates (and compensates for) the channel frequency responses $H_i[n,k]$ $1\leq i\leq M$ in order to recover the serial data block $b[n]$. This channel estimation in a MIMO OFDM embodiment may be performed by sending a group of training sequences from the transmitter, measuring the received training sequence at the receiver, and correlating the received sequence with the sequences known to have been transmitted. The specific training sequences used in channel estimation may affect the accuracy and complexity of the channel estimation itself. In an embodiment, therefore, channel estimation may be performed in a special training stage, wherein $\{t_i[n,k]\}$ for $1\leq i\leq M$ are specifically chosen to be a set of training sequences (sometimes called optimum training sequences) that are suitable for a particular application. Methods for selecting training sequences for use in OFDM channel estimation are discussed in "*Simplified Channel Estimation for OFDM Systems with Multiple Antennas*", Ye Li, IEEE Transactions of Wireless Communications, Vol 1., No. 1, pp. 67-75, Jan. 2002, the contents of which article are incorporated herein by reference.

In an embodiment of the training stage utilized to estimate $H_i[n,k]$, M predetermined training sequences are adopted as $t_1[n,k]$, $t_2[n,k]$, ..., $t_M[n,]$ respectively. For example, the time-domain waveform of the training sequence $t_1[n,k]$ transmitted by a first transmit antenna is circularly shifted (e.g., left-shifted) to achieve the time-domain waveform of a second training sequence $t_2[n,k]$ transmitted by a second transmit antenna, but is otherwise identical to that of the first training sequence. That is, these time-domain training sequences are the same but for a circular shift. The magnitude of the circular shift is determined by the number of training sequences needed, i.e., M. In one embodiment wherein the number of transmit antennas M=3, the time-domain waveform of each training sequence $t_i[n,k]$ is circularly shifted by a fraction 1/M of the width (in samples) of the signal space K, which is the number of data subchannels of the OFDM system. Thus, in an embodiment having M=2 transmit antennas, M=2 training sequences are adopted; the time-domain waveforms of these training sequences are identical, with the understanding that the time-domain waveform of the second training sequence (transmitted by the second transmit antenna) is circularly shifted by K/M=K/2. In other embodiments, one may circularly shift the sequence by a smaller or larger amount; shifting the sequence by different amounts may alter the length of the estimated CIR (channel impulse response).

Because of the special orthogonal characteristics of the group of training sequences (having relatively high correlation only for and near zero circular shift), and because the transmitted set of training sequences is already known by the channel estimator 180, it is possible to isolate the channel impulse responses for each of the multiple transmit antennas so that the channel frequency response characteristics $H_i[n,k]$ for each transmit antenna may be determined independently. The correlation spectrum (frequency domain) for each tone k is calculated as $\eta[n,k]=r[n,k]\cdot t_1^*[n,k]$, where $t_1^*[n,k]$ is the complex conjugate of the transmitted training sequence from the first transmit antenna at the tone k. The frequency-domain multiplication of the received sequence $r[n,k]$ with the complex conjugate of the transmitted training sequence $t_1[n,k]$ provides the cross-correlation between these sequences. By performing a IDFT on that resulting correlation spectrum $\eta[n,k]$, the time-domain correlation sequence $p[n,k]$ may be determined per the following equation:

$$p_i[n, l] = \sum_{k=0}^{K-1} r[n, k] t_i^*[n, k] W_K^{kl} \qquad (4)$$

Figure 2:
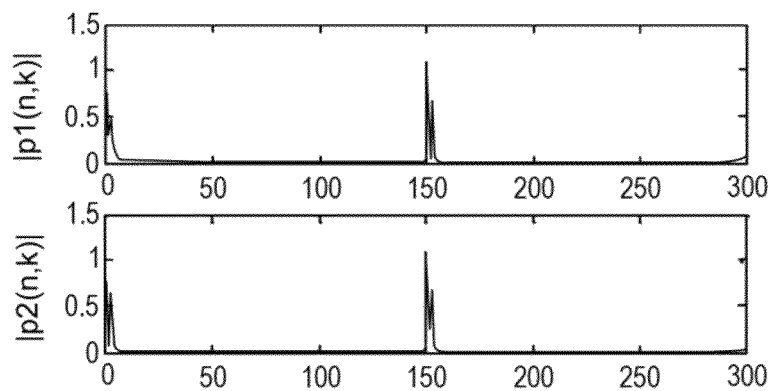
FIG. 2 is a time-domain plot of an embodiment of a pair of time-domain correlation sequences achieved by correlating shifted training symbol waveforms transmitted by respective transmit antennas in a multiple-transmit-antenna system (such as the system of FIG. 1) with the signal received by a receive antenna in that system.

FIG. 2 depicts a sample space with K=300 subchannels, and the time-domain waveforms of the correlation sequence $p_i[n,0]$, $p_i[n,1]$, ..., $p_i[n,K-1]$ for an embodiment of a multiple-antenna OFDM communication system. In the depicted embodiment, the system has M=2 transmit and one receive antennas. A transmission bandwidth of $K\Delta f=4.5$ MHz is divided into K=300 subcarriers, with $K_0=K/M=150$, where $K_0$ is the maximum span (in samples) of each channel impulse response when sampled at a rate of $K\Delta f$.

Row 1, $|p_1[n,k]|$, of FIG. 2 is the time-domain magnitude waveform of the correlation sequence for the signal received by receiver antenna 150 from the first transmit antenna (i=1); Row 2, $|p_2[n,k]|$, is the time-domain magnitude waveform of the correlation sequence for the signal received by receiver antenna 150 from the second transmit antenna (i=2). Because, as discussed above, the time-domain waveform of the training sequence $t_2[n,k]$ is a circularly shifted version of that of the training sequence $t_1[n,k]$, it can be shown that Row 2 is achieved by circularly shifting Row 1 by $K_0=150$ samples. Therefore, Row 1 $\{p_1[n,0], p_1[n,1], ..., p_1[n,K-1]\}$ contains the estimates of the channel impulse responses for all transmission paths. In fact, each correlation sequence (each of Rows 1 and 2) includes the channel impulse response for every transmit antenna in the embodiment. Each of the high-energy regions within the correlation sequence depicted in Row 1 corresponds to the channel impulse response from a separate transmit antenna. Thus, while the estimated channel impulse response corresponding to the first transmit antenna (i=1) corresponds to the high-energy region centered at sample index $k=(i-1)K_0=0$ in Row 1, the estimated channel impulse response corresponding to the second transmit antenna (i=2) corresponds to the portion of the correlation sequence from Row 1 centered at sample index $k=(i-1)K_0=150$.

For simplification, an embodiment with a single receive antenna 150 is again utilized here, but embodiments are practicable with any number of transmit and receive antennas. If an embodiment with two transmit and two receive antennas were utilized, a plot equivalent to FIG. 2 would comprise a total of four rows, representing two correlation sequences (corresponding to each of the two transmit antennas) for each of the two respective receive antennas.

As described above, the time-domain signals $|p_i[n,k]|$ in FIG. 2 are the amplitude waveforms of the correlation between the signal received at a single receive antenna 150 and the training sequences from each transmit antenna 140, as calculated by channel estimator 180, which performs an IDFT on the correlation spectrum $r[n,k] \cdot t_i^*[n,k]$ (IDFT block not shown) per equation (4). The first 150 samples in Row 1 and Row 2 are the estimate of channel impulse responses for transmit antenna 1 and 2, respectively.

In an embodiment, oversampling is utilized by inserting a guard interval on either side of the K data subcarriers in the frequency domain. For example, the OFDM signal may be oversampled with a 7.68 MHz sampling frequency, and the oversampled OFDM signal is generated by IDFT block 120 with a 512-point IDFT. Therefore, 106 points on each end of the 300 data points are set to '0' as a guard interval. The "oversampling factor" is the ratio of the width of the generated IDFT to the original number of data subcarriers; in this embodiment, for example, the oversampling factor is 512/300≈1.7. Isolating the K data subcarriers within the received signal $r[n,k]$ is equivalent to passing the signal through a low pass filter (not shown). In the time domain, the insertion of these guard intervals increases the span widths $K_0$ of the estimated channel impulse responses. Therefore, in $p_1[n,k]$, part of one estimated channel impulse response may leak into the response of a neighboring channel and blur the boundary between them. In FIG. 2, this is evident from the low-energy samples surrounding the high-energy regions centered at sample index k=150 and sample index k=300. This leakage may introduce an error into the estimation of the channel between the receive antenna and the transmitting antenna that transmitted the corresponding training sequence. That is, the channel estimates may be inaccurate due to this energy leakage because it may be more difficult to determine the boundaries between individual estimated channel impulse responses.

As discussed above, although the set of training sequences utilized in the special training stage may be designed to allow the section of the time-domain correlation sequence corresponding to each training sequence to be isolated from the neighboring section, energy leakage between those sections may occur if the boundaries between these sections are inaccurately determined, and such energy leakage may distort the channel estimation. To more accurately determine the boundaries between individual sections of the correlation sequence (i.e., the boundaries between the separate channel impulse responses corresponding to the separate transmit antennas), in an embodiment the end (or any other predetermined region, such as the center or front) of a sliding window, positioned at a sample index $f_i$, is shifted over a range $\{p_1[n, \lfloor(i-\alpha) K_0\rfloor] \ldots p_1[n, iK_0]\}$ of the $p_1[n,k]$ waveform to determine the value of $f_i$ where the sum of sample energy within the sliding window is at minimum. The position of this index within the sample space corresponds to the boundary that provides the least energy leakage between the relevant sections of the correlation sequence and, therefore, the most accurate boundary between the separate channel impulse responses. In another embodiment, the sliding window may shifted over the range to determine a value for $f_i$ at which the sum of sample energy within the sliding window meets other criteria. For example, the sum may have a value that is a certain percentage below a maximum sum found within the range.

The width of the sliding window, which determines the sensitivity and accuracy of boundary detection, may be set empirically based on the maximum span width $K_0$ and the oversampling factor. For the waveforms illustrated in FIGS. 2-3, for example, where each section is ideally isolated within $K_0$=150 samples and the oversampling factor is approximately 1.7, the width of the sliding window may be appropriately determined as 10 and $\alpha$ as 0.5. Generally, the larger the oversampling factor, the larger $\alpha$ and the search range is, and the wider the sliding window. However, the width of the sliding window is less than the search range in an embodiment.

Figure 3A:
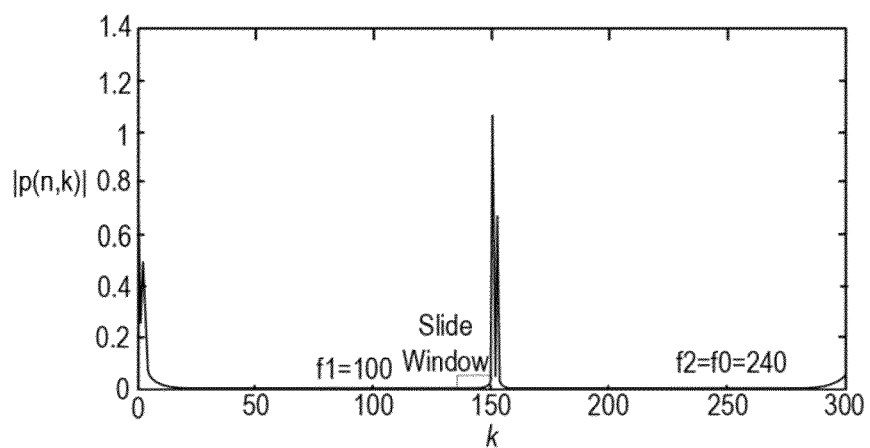
FIGS. 3*a*-3*c* are time-domain plots that illustrate an embodiment of a method for parsing the time-domain waveforms of FIG. 2.
Figure 3B:
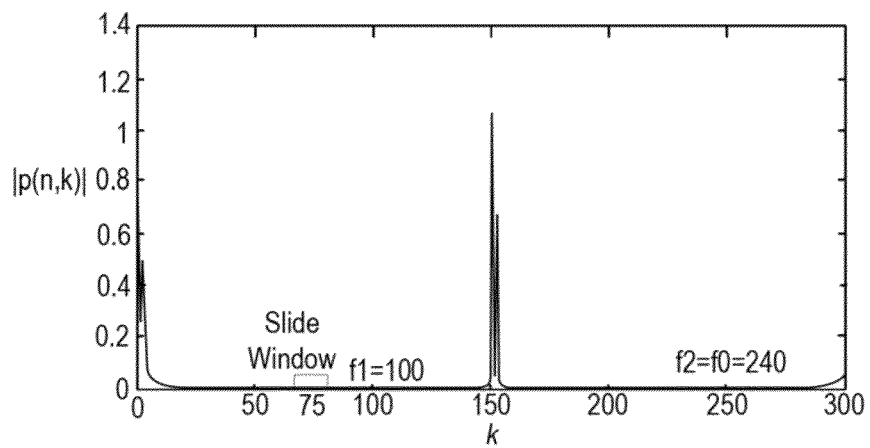
Figure 3C:
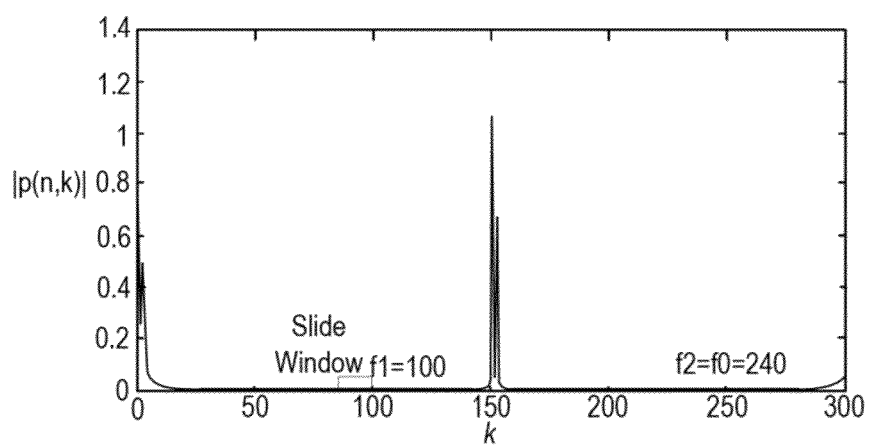

FIGS. 3a-3c depict the waveform $|p_1[n,k]|$ of the correlation sequence from Row 1 of FIG. 2 and a sliding window 301 in several positions, each of which corresponds to a different value for sample index $f_i$. In FIG. 3a, the sliding window 301 is positioned such that $f_i$ (corresponding to the rightmost end of the sliding window) has the value of $f_i=p_1[n,iK_0]=K_0=150$. The summed sample energies within window 301 are relatively large. To accurately determine the boundaries of the two correlation sections for two transmit antennas, sliding window 301 is shifted along $|p_1[n,k]|$ (by a single sample at a time) from its position in FIG. 3a to its position in FIG. 3b, wherein the value of sample index $f_i=p_1[n,\lfloor(i-\alpha)K_0\rfloor]=(1-0.5)K_0=75$. For each position of the sliding window 301, the energy of the samples contained within are summed.

In FIG. 3c, the value of the sample index $f_1$=100, corresponding to the end of sliding window 301, is such that the sum of the sample energies within the sliding window 301 is minimized. The value of $f_i$ corresponding to the position of the rightmost end of sliding window 301, indicates the sample index to be used as the most accurate end-boundary (the boundary that provides for the least leakage of energy from the second transmit antenna) of the estimated channel impulse response corresponding to the first transmit antenna (i=1).

In the same way, by shifting the sliding window 301 from $f_i$=300 to $f_i$=225, the sample index $f_2$=240 is found to be the most accurate end-boundary of the estimated channel impulse response for the second transmit antenna (i=2).

Next, the channel estimator 180 may determine the channel impulse response for the channel between the first (i=1) transmit antenna 140 and the receive antenna 150 according to the following expression:

$$h_1[n, l] = \frac{1}{K} p_1[n, l] \text{ for } 100 \le l \le 240 \quad (5)$$

And, the channel estimator 180 may determine the channel impulse response for the channel between the second (i=2) transmit antenna 140 and the receive antenna 150 according to the following expression:

$$h_2[n, l] = \frac{1}{K} p_2[n, l] \text{ for } 0 \le l \le 100 \text{ and } 240 \le l \le 300 \quad (6)$$

and

Equations (5) and (6) allow calculation of the channel impulse responses without performing a matrix inversion.

Figure 4:
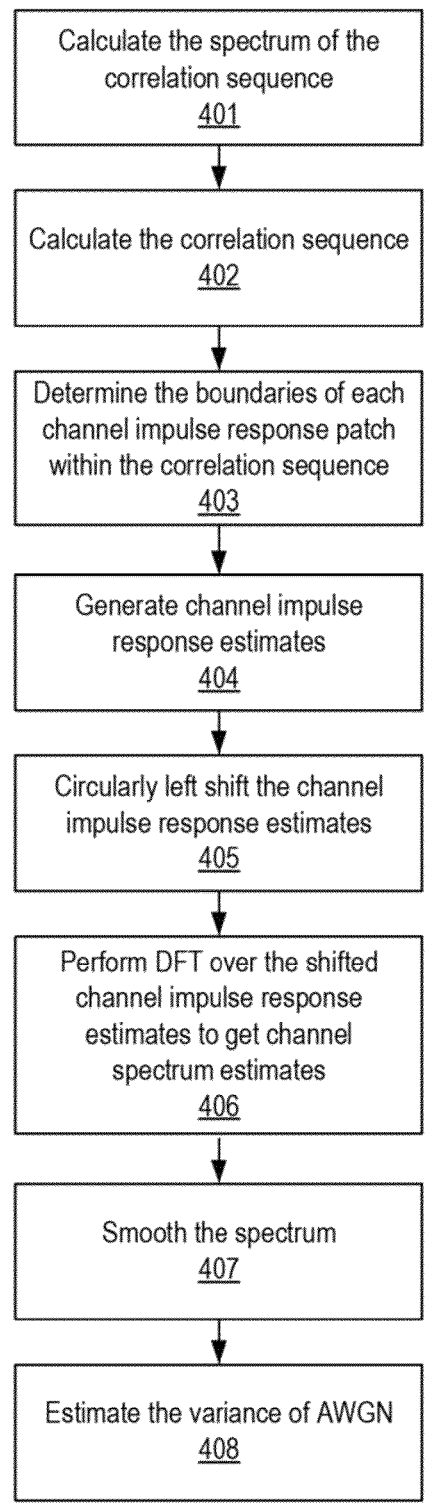
FIG. 4 is a flowchart of an embodiment of a method for channel estimation.

FIG. 4 is a flow chart of an embodiment of a method for channel estimation that may include steps for a procedure similar to the procedure discussed above in conjunction with FIGS. 2-3C. The steps outlined in FIG. 4 are for illustration only and are not meant to limit the exact order or procedure of the specific example discussed. In the following discussion, $\{t_i[n,k]\}$ for $1 \leq i \leq M$ is again a set of suitable optimum training sequences. For simplification, an embodiment with a single receive antenna is assumed. Of course, embodiments are practicable with any number of transmitter and receive antennas.

In step 401, the spectrum $\eta[n,k]$ (frequency domain) of the correlation between the received training sequence $r[n,k]$ and the training sequence $t_1[n,k]$ is calculated as $\eta[n,k]=r[n,k] \cdot t_1^*[n,k]$ for each tone k.

In step 402, the time-domain correlation sequence $p_1[n,k]$ is then calculated by performing an IDFT on the correlation spectra $\eta_1[n,k]$. The correlation sequence is a time-domain waveform, similar to those depicted in FIG. 2. Again, by using circular shifting, the training sequence sent by the first transmit antenna may be used to derive the correlation sequence between the received signal and the training sequences sent from all of the other transmit antennas as well. This is because the time-domain waveform of each training sequence is a circularly-shifted version of the first training sequence, sent by the first transmit antenna i=1.

In step 403, the boundaries of the channel impulse response estimate for each transmit antenna are found within the first correlation sequence $p_1[n,k]$ by partitioning the sample space into a number of partitions equal to the number of transmit antennas M. For each transmit antenna i, a sample window is moved along the entirety of the partition found between sample index $(i-\alpha)K_0$ and sample index $iK_0$ of the correlation sequence $p_1[n,k]$ as found in step 402 above. In this way, the sample window is used to find the index $f_i$ where the sum of energy samples within the window is at minimum. In another embodiment, the boundaries may be determined by circularly shifting the sample window to find a position where the sum of energy samples matches other desired criteria.

In step 404, the channel impulse responses $\tilde{h}_i[n,k]$ corresponding to each of the transmitting antennas i are estimated. The correlation sequence $p_1[n,k]$ calculated in step 402 is circularly shifted, for example left-shifted by $f_{i-1}$, to get $p_1'[n,k]$. The channel impulse responses corresponding to the first and second transmit antennas 140 may be calculated according to the following expression, where all samples outside the respective set of boundaries for each impulse determined in step 403 are set to zero (which is what is effectively done in equation (6)):

$$\tilde{h}_i[n,k] = \begin{cases} \frac{1}{K} p_1'[n,k] & k \in [0, (f_i - f_{i-1}) \bmod K \\ 0 & \text{else} \end{cases} \quad (7)$$

This isolates the channel impulse response for each particular channel, and may also reduce noise.

In step 405, the channel impulse response estimates $\tilde{h}_i[n,k]$ are circularly, shifted as suitable. For example, in an embodiment the estimate $\tilde{h}_i[n,k]$ is left-shifted by $[(i-1)K_0 - f_{i-1}] \bmod K$, to get $(\hat{h}_i[n,0], \hat{h}_i[n,1], \ldots, \hat{h}_i[n,K-1])$. The circular shifting effectively moves the impulse-response estimates so that their leftmost boundary is aligned with zero in preparation for the DFT in step 406.

In step 406, the channel frequency response estimates $H_i'[n,k]$ are then obtained by performing respective DFTs on $h_i[n,k]$ with the appropriate circular shift from step 405.

In an optional step 407, the resulting channel estimates $H_i'[n,k]$ may be smoothened to provide a more accurate estimation of the channel frequency response. In one embodiment, the channel estimates $H_i'[n,k]$ may be smoothened by averaging the samples from a predetermined number of consecutive training sequences between steps 405 and 406. In another embodiment, an averaging Frequency Impulse Response (FIR) filter may be used. However, such an averaging FIR filter may result in removing a significant portion of a signal's high-frequency content as well as noise. In still another embodiment, a quadratic Savitzky-Golay filter may be used to smooth the spectrum estimate $H_i'[n,k]$ Savitzky-Golay smoothing filters are also called digital-smoothing polynomial filters or least-squares smoothing filters, and are typically used to "smooth out" a noisy signal with a large frequency span. In an embodiment using a Savitzky-Golay smoothing filter, the smoothened channel frequency response estimate $\hat{H}_i[n,k]$ from the Savitzky-Golay algorithm is given by:

$$\hat{H}_i[n,k] = \frac{\sum_{j=-N}^{N} A_j H_i'[n, k+j]}{\sum_{j=-N}^{N} A_j}, \quad (8)$$

define $H_i'[n,k] = 0$ when $k < 0$ or $k \geq K$

The coefficient $A_j$ of the filter is time-invariant and may be calculated offline according to the span width 2N+1 and the polynomial order. A suitable span width of the Savitzky-Golay filter may be selected empirically. In an embodiment, N may be selected as $\lfloor K/2L \rfloor$, where K is the total number of the data subcarriers and L is the path number of the real channel, determined by the channel model. That is, the channel between each transmit antenna and each receive antenna may be a multipath channel, and L is the modeled number of paths per channel. In the sample space depicted in FIG. 2, for example, the length of each training sequence is K=300 and a 3GPP SCM-Suburban Macro channel model (L=6) is adopted. An appropriate span width of the Savitzky-Golay filter would therefore be 2(K/2L)+1=2*300/12+1=51. The wider the filter span, the smoother the resultant channel estimation but the greater the computational load. In another embodiment, a filter span width of $2\lfloor K/4L \rfloor+1$ may be utilized.

In an optional step 408, the variance of any additive white Gaussian noise (AWGN) affecting the channel is estimated. In an embodiment, this variance may be found as:

$$\hat{\sigma}_n^2 = \frac{\sum_{i=1}^{M} \sum_{k=0}^{K} |\hat{H}_i[n,k] - H_i'[n,k]|^2}{K} \quad (9)$$

and maybe utilized within known Minimum Mean Square Error algorithms to more accurately estimate all received symbol sequences during use of the OFDM communications system.

The following is an example of an embodiment of the above-described channel-estimation technique described in more physical terms and fewer mathematical terms as compared to the above description.

Referring again to FIG. 1, assume for example purposes that the transmitter 101 comprises the transmit diversity processor 110 coupled to four IDFT blocks 120 and four corresponding transmit antennas 140₁-140₄, and the receiver 102 comprises one DFT block and one corresponding receive antenna 150. Therefore, in this example, the following four separate channels exist between the transmitter 101 and the receiver 102: a first channel between the first transmit antenna $140_1$ and the receive antenna 150, a second channel between the second transmit antenna $140_2$ and the receive antenna, a third channel between the third transmit antenna and the receive antenna, and a fourth channel between the fourth transmit antenna $140_4$ and the receive antenna. Of course the principles illustrated in this example may apply generally to a system 100 having any number of transmit antennas 140 and any number of receive antennas 150.

During channel estimation, the transmit diversity processor 110 simultaneously transmits a respective training sequence via each of the four transmit antennas 140. Each training sequence is the same sequence, but circularly shifted in the time domain relative to the other sequences. For example, the first transmit antenna transmits the training sequence with zero circular shift, and the second transmit antenna transmits the training sequence with a circular shift of S/M, where M is the number of antennas and S is the number of time-domain samples in the symbol period over which the training sequence is transmitted. The third transmit antenna transmits the training sequence with a (2S/M) circular shift, and the fourth transmit antenna transmits the training sequence with a (3S/M) circular shift. For example, where S=128, then the circular shifts are 0, 32, 64, and 96, respectively.

The receiver 102 receives the resulting signal via receive antenna 150 and DFT block 160. The channel estimator 180 calculates the correlation spectrum by correlating the received signal with the training sequence known to have been transmitted by the first transmit antenna $140_1$. The channel estimator 180 calculates the actual correlation sequences $p_i[n,k]$ by performing an IDFT on the correlation spectrum.

Figure 5:
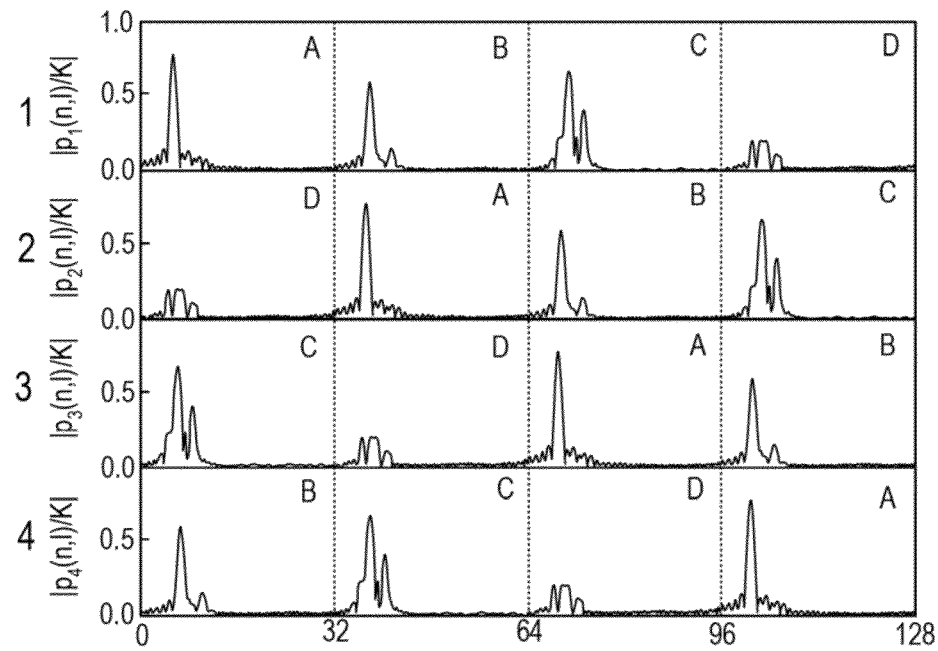
FIG. 5 includes time-domain plots of an embodiment of a plurality of correlation sequences in a wireless multiple-transmit-antenna system.

For example, referring to the time-domain correlation plots of FIG. 5, the transmit antennas $140_1$-$140_4$ each transmits a training sequence that is the same but for a circular shift of 96, 64, and 32 samples, respectively. All four of these transmitted training sequences are received by the receiver antenna 150.

Next, the channel estimator 180 correlates the received signal r[n,k] for all k tones with the training sequence transmitted by the first transmit antenna $140_1$, and this correlation yields the plot in row 1 of FIG. 5, where the block A represents the channel impulse response $h_1[n,l]=(1/K)p_1[n,l]$ for the first channel between the first transmit antenna $140_1$ and the receive antenna 150, the block B represents the channel impulse response $h_4[n,l]=(1/K)p_4[n,l]$ for the fourth channel between the fourth transmit antenna $140_4$ and the receive antenna 150, the block C represents the channel impulse response $h_3[n,l]=(1/K)p_3[n,l]$ for the third channel between the third transmit antenna $140_3$ and the receive antenna 150, and the block D represents the channel impulse response $h_2[n,l]=(1/K)p_2[n,l]$ for the second channel between the second transmit antenna $140_2$ and the receive antenna 150.

The channel estimator 180 may stop the correlation process here, or it may continue to correlate the received signal r[n,k] for all k with the training sequences transmitted by any one or more of the second, third, and fourth antennas $140_2$-$140_4$ to obtain rows 4, 3, and 2 of FIG. 5, respectively. If the channel estimator 180 continues, then it may calculate the channel impulse response $h_1[n,l]$ from any of the blocks A of FIG. 5, the channel impulse response $h_2[n,l]$ from any of the blocks D, the channel impulse response $h_3[n,l]$ from any of the blocks C, and the channel impulse response $h_4[n,l]$ from any of the blocks B.

Figure 6:
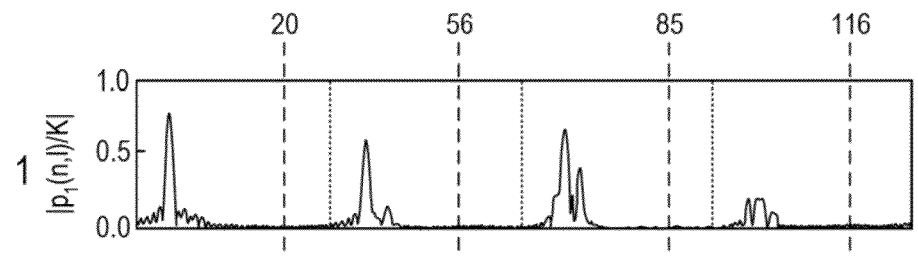
FIG. 6 is a time domain plot of a correlation sequence and illustrates an embodiment for obtaining channel response estimates.

Referring to FIG. 6, In an embodiment, the channel estimator 180 determines the channel impulse responses $h_1$-$h_4$ from row 1 by shifting a sample window, a single sample at a time, rightward along row R1 from an initial position at sample 0 (far left of row 1) to a final position that is dependent on the parameters of the sample space and the parameters determined for the sample window itself, to determine the boundaries between the waveforms in blocks A-D in a manner similar to that discussed above in conjunction with FIGS. 3a-3c. This is because the waveform boundaries may not be the same as the block boundaries. In the embodiment of FIG. 6, for example, the sample window may be given a width of 8 samples. At each window position, the magnitudes (e.g., the energies) of all samples within the sample window may be summed. In this way, the border between the waveform of the correlation sequence in block A and the waveform in block B may be determined as occurring at the sample window position where the sum of the samples within the sample window are at a minimum compared to other window positions between the waveforms in blocks A and B. The channel estimator 180 may determine the minimum-energy boundaries between the waveforms in the blocks B, C, and D, and the minimum-energy boundary between the waveforms in blocks D and A, in a similar manner. For example, the channel estimator may determine that these minimum-energy boundaries are located a sample indices 20, 56, 85, and 116, respectively. As discussed below, determining the waveform boundaries in this manner, as compared to using the block boundaries at sample indices 0, 32, 64, and 96, may allow a more accurate calculation of the channel frequency responses by reducing or eliminating energy leakage across the waveform boundaries.

To determine the channel frequency-response/estimates (estimated amplitudes and phases for each subcarrier k in the signal space), the channel estimator 180 performs a DFT on the samples between each of the boundaries. For example, to determine the frequency response $H_1[n,k]$ for the channel between the transmit antenna $140_1$ and the receive antenna 150, the channel estimator performs a DFT on the samples between the boundary 116 and the boundary 20 (the samples may or may not include one or both of the boundary samples). The channel estimator 180 may do this by circularly right shifting the samples until the boundary 116 is aligned with sample 0 (13 shifts), setting all samples to the right of the shifted boundary 20 (now aligned with sample 33) to zero, and performing a 128-point DFT on the resulting waveform.

The channel estimator 180 may determine the frequency responses $H_2[n,k]$, $H_3[n,k]$, and $H_4[n,k]$ for the channels between the receive antenna 150 and the transmit antennas $140_2$-$140_4$, respectively, in a similar manner. From the channel response estimates, the receiver 102 may determine the attenuation and phase shift imparted to the subcarriers by each channel, and determine a correction vector for each channel as described above and/or in a conventional manner.

As discussed above, the channel response estimates may additionally be filtered (as with a Savitzky-Golay filter, for example) to obtain a smooth channel response estimate. Additionally, the variance of Gaussian noise may additionally be estimated.

It is to be understood that even though various embodiments and advantages have been set forth in the foregoing description, the above disclosure is illustrative only, and changes may be made in detail, and yet remain within the broad principles of the disclosed subject matter. For example, the communications system may have any number of transmit or receive antennas, and may comprise one or more integrated circuit devices. In some embodiments, the methods or individual steps described may be performed in a hardware implementation. In other embodiments, a software implementation may be utilized. In still other embodiments, the methods or individual steps described may be performed by a combination of hardware and software modules.

What is claimed is:

1. A receiver, comprising:
an antenna node configured to receive a signal that includes a superposition of at least a first signal corresponding to a first sequence and a second signal corresponding to a second sequence wherein the sequences are substantially similar in length; and
a channel estimator coupled to the antenna node and configured to correlate the received signal with at least one of the first and second sequences, to determine at least one boundary between at least two waveforms resulting from the correlation, and to calculate using the boundary and the at least two waveforms a first channel response corresponding to the first signal and a second channel response corresponding the second signal.

2. The receiver of claim 1, further comprising an antenna coupled to the antenna node.

3. The receiver of claim 1, further comprising:
a conversion unit configured to convert the received signal from the time domain into the frequency domain; and
wherein the channel estimator is configured to correlate the received signal with the one of the first and second sequences by multiplying the frequency domain version of the received signal with a conjugate of a frequency domain version of the one of the first and second sequences.

4. The receiver of claim 1 wherein the channel estimator is configured to determine the at least one boundary by finding a region of least energy between the first and second waveforms and locating the boundary adjacent to the region.

5. The receiver of claim 1 wherein the channel estimator is configured to determine the at least one boundary by finding a region of least energy between the first and second waveforms and locating the boundary within the region.

6. The receiver of claim 1 wherein the channel estimator is configured to calculate the first channel response by converting one of the waveforms on one side of the boundary into the frequency domain, and to calculate the second channel response by converting another of the waveforms on the other side of the boundary into the frequency domain.

7. The receiver of claim 1 further comprising a noise module coupled to the channel estimator and configured to estimate a characteristic of noise present in the received signal.

8. The receiver of claim 7 wherein the estimated characteristic is the variance.

9. The receiver of claim 1 wherein calculating the first channel response comprises smoothing the first channel response.

10. The receiver of claim 9 wherein smoothing the first channel response comprises using a Savitzky-Golay filter.

11. A system, comprising:
a processor; and
a receiver coupled to the processor and having an antenna node configured to receive a signal that includes a superposition of at least a first signal corresponding to a first sequence and a second signal corresponding to a second sequence, the antenna node coupled to more than one antenna, and
a channel estimator coupled to the antenna node and configured to correlate the received signal with at least one of the first and second sequences, to determine at least one boundary between at least two waveforms resulting from the correlation, and to calculate using the boundary and the at least two waveforms a first channel response corresponding to the first signal and a second channel response corresponding the second signal.

12. The system of claim 11, further comprising an antenna coupled to the antenna node.

13. The system of claim 11, further comprising:
a conversion unit configured to convert the received signal from the time domain into the frequency domain; and
wherein the channel estimator is configured to correlate the received signal with the one of the first and second sequences by multiplying the frequency domain version of the received signal with a conjugate of a frequency domain version of the one of the first and second sequences.

14. The system of claim 11 wherein the channel estimator is configured to determine the at least one boundary by finding a region of least energy between the first and second waveforms and locating the boundary adjacent to the region.

15. The system of claim 11 wherein the channel estimator is configured to determine the at least one boundary by finding a region of least energy between the first and second waveforms and locating the boundary within the region.

16. The system of claim 11 wherein the channel estimator is configured to calculate the first channel response by converting one of the waveforms on one side of the boundary into the frequency domain, and to calculate the second channel response by converting another of the waveforms on the other side of the boundary into the frequency domain.

17. The system of claim 11 wherein the receiver further comprises a noise module coupled to the channel estimator and configured to estimate the variance of noise present in the received signal.

18. The system of claim 11 wherein calculating the first channel response comprises smoothing the first channel response.

19. A method, comprising:
receiving a signal at a receiver having multiple antennas, the signal including a superposition of at least a first signal corresponding to a first sequence and a second signal corresponding to a second sequence;
determining a waveform by correlating the received signal with at least one of the first and second sequences, the waveform having a first portion and a second portion;
determining at least one boundary between the first portion of the waveform and the second portion of the waveform; and
calculating, using the boundary and the at least two portions, a first channel response corresponding to the first signal and a second channel response corresponding the second signal.

20. The method of claim 19, further comprising:
converting the received signal from the time domain into the frequency domain; and
correlating the received signal with the one of the first and second sequences by multiplying the frequency domain version of the received signal with a conjugate of a frequency domain version of the one of the first and second sequences.

21. The method of claim 19, wherein determining the at least one boundary comprises finding a region of least energy between the first and second portions and locating the boundary adjacent to the region.

22. The method of claim 19, wherein determining the at least one boundary comprises finding a region of least energy between the first and second portions and locating the boundary within the region.

23. The method of claim 19, wherein calculating the first channel response comprises converting one of the portions on one side of the boundary into the frequency domain, and calculating the second channel response comprises converting another of the portions on the other side of the boundary into the frequency domain.

24. The method of claim 19 further comprising estimating a characteristic of noise present in the received signal.

25. The method of claim 19 wherein calculating the first channel response comprises smoothing the first channel response.

26. A system, comprising:
   a processor; and
   a receiver coupled to the processor and having multiple antennas coupled to an antenna node configured to receive a signal that includes a superposition of at least a first signal corresponding to a first sequence and a second signal corresponding to a second sequence, and
   a channel estimator coupled to the antenna node and configured to correlate the received signal with at least one of the first and second sequences, to determine at least one boundary between at least two waveforms resulting from the correlation, and to calculate using the boundary and the at least two waveforms a first channel response corresponding to the first signal and a second channel response corresponding the second signal.

27. The system of claim 26, wherein the first sequence corresponds to a portion of the signal received through a first antenna and the second sequence corresponds to a portion of the signal received through a second antenna.

* * * * *